United States Patent [19]
Barr et al.

[11] Patent Number: 5,297,181
[45] Date of Patent: Mar. 22, 1994

[54] METHOD AND APPARATUS FOR PROVIDING A DIGITAL AUDIO INTERFACE PROTOCOL

[75] Inventors: Keith Barr, Los Angeles; Alan Zak, Culver City; Marcus Ryle, Marina del Rey; David Brown, Los Angeles; Carl Lafky, Simi Valley, all of Calif.

[73] Assignee: Alesis, Los Angeles, Calif.

[21] Appl. No.: 822,469

[22] Filed: Jan. 17, 1992

[51] Int. Cl.⁵ .............................................. H03D 3/24
[52] U.S. Cl. .................... 375/119; 375/116; 375/111
[58] Field of Search ............... 375/110, 111, 114, 116, 375/119, 120

[56] References Cited

U.S. PATENT DOCUMENTS

4,803,703  2/1989  DeLuca et al. ..................... 375/114
5,010,559  4/1991  O'Connor et al. .................. 375/114

Primary Examiner—Curtis Kuntz
Assistant Examiner—T. Ghebretinsae
Attorney, Agent, or Firm—Hecker & Harriman

[57] ABSTRACT

A digital audio interface protocol carries multiple channels of digital audio information serially between a transmitting digital audio tape recorder and a plurality of receiving recording units. Using a three stage process, the circuitry of the present invention allows the receiving VCO's to "lock on" to the sampling rate of the serial digital data stream without any explicit sampling information. In a first stage, the VCO frequency is adjusted until a sync pattern is properly received. In a second stage, the VCO frequency is adjusted to oscillate a preselected number of times between sync pattern occurrences. In a third stage, the VCO phase is adjusted to match the phase of the serial data stream.

19 Claims, 7 Drawing Sheets

METHOD AND APPARATUS FOR PROVIDING A DIGITAL AUDIO INTERFACE PROTOCOL

BACKGROUND OF THE PRESENT INVENTION

1. Field of the Invention

The present invention relates to the field of digital signal processing and, more specifically, to a method and apparatus for broadcasting, and synchronizing a VCO to, a serial digital signal.

2. Background Art

Electronic communication of serial digital data is straightforward if the sending clock frequency and phase are known by the receiver, but problems arise when the transmitted data clock frequency and phase are unknown. In such situations, the exact phase of the sending clock can be inferred by the temporal positioning of the received data bits, a technique that is currently in practice. In such a scheme, a receive voltage controlled oscillator is affected by a phase comparator, detecting the phase of the receive clock on the receipt of each data bit. The result of this phase comparison can be applied to the voltage control input of the VCO to achieve the locking of phase of the receiver to the incoming data. This technique, however, is only useful when the transmitter clock is within the capture range of the receiver VCO/phase locking loop. The receiver must have prior knowledge of the expected incoming data rate for effective phase locking to occur.

The transmitted data rate may vary from transmission to transmission, provided some means is provided to inform the receiving station as to the approximate sending data rate. Typically, pilot tones precede the data message, indicating the following data rate, and can be used by the receiving station to set its receive clock to an approximate frequency, whereby subsequent phase locking can occur once the data transmission begins.

Although a parallel bus is ideal for interconnecting a distributed multi-channel system, for a point-to-point connection, the use of fiber optics is desirable, particularly as distances increase. An optical fiber is a filament (e.g., glass or plastic) that is formed in such a way that light is constrained to travel along it. Signal transmission is achieved by modulating the power of a light-emitting diode (LED) or small laser coupled to the fiber. A phototransistor at the end opposite the LED converts the received light back to an electrical signal for eventual signal processing.

Optical fibers have numerous advantages over electrical cabling. Optical fibers neither generate, nor are prone to, electromagnetic interference and, as they are insulators, ground loops cannot occur. On the other hand, electrical cabling may generate undesirable radio frequency signals.

Many fiber optic systems are currently available. One fiber optic system, manufactured by Sharp Corporation, consists of a transmitter and a receiver that both operate from of a 5 volt power supply, and provide connection through logic levels. The transmitter works by turning on an LED when the logic input is high, and the receiver provides a logical high output when sufficient light is received at the other end of the interconnecting cable.

Since the receiver must pick up and amplify the LED signal from a photodiode, very high gains must be used, and the signals must be AC coupled. As a result, the output of the receiver is a replica of the logic level at the transmitter, but the LED must be alternating on and off at a high rate for the receiver to function properly. Minimum signal rate requirements of 100 kHz are not uncommon.

Further, Tdlh (delay time from transmitter turning on to receiver output going high) is different from Tdlh (delay time from transmitter turning off to receiver output going low). Assume that 8 channels each consisting of 24-bits of digital information are transmitted over a fiber optic cable. These 192 bits of information cannot simply be set end to end and sent to the transmitter, since if all of the bits were zero, the LED would not alternate on and off, causing the receiver to malfunction. Also, if a long string of bits has the same polarity, the receive logic has no way of knowing how many bits of that same polarity have passed. To accurately convey data, then, some clock information (regular changes in the data pattern) must exist in the data stream to give clues to the receive logic as to the data transmission rate.

In the following discussion, Non Return to Zero Inverted (NRZI) encoding is understood to apply. In NRZI, transmitted data is represented by a transition within the channel from one binary condition to the other, and such a transition is noted as a transmitted '1'. Periods of time without transitions, however, may or may not equivalently represent the data sequence to be transmitted. The data to be transmitted, a sequence of data 1's and 0's, is transformed via a modulation code, prior to transmission. At the receive end, the sequence of received transitions, is decoded into the original data 1 and 0 sequence by a receive decoder.

The main purpose for modulation coding is to provide adequate transmit clock information. An adequate modulation coding scheme is one that allows a continuous stream of data zeros or ones to be represented by a channel pattern that contains enough transitions (channel 1's) that the receive clock can accurately infer the transmit clock's phase.

Several techniques for receiving standardized modulation codes are available. For example, FM coding is commonly used to convey digital data. In the FM modulation scheme, two transmit clock cycles are used to represent each serially transmitted data bit. A data '1' is represented by two channel transitions (two channel '1's), and a data '0' is represented by a single channel transition (single channel '1').

In the case of FM coding, the receiver can deduce the correct receive clock frequency by the receipt of a single data '1', which is represented by two transitions, one during each transmit clock period. However, if the data message happens to contain only data zeros, the receiver, not knowing the transmit clock frequency, will not be capable of knowing whether the message was correctly a stream of data '0's, or incorrectly, a stream (half as long) of '1's, at half the original clock frequency.

FM could be used to unambiguously communicate a message, and achieve clock synchronization as well, provided the data was previously grouped into blocks of predefined length, and sufficient extra bits were used to define the clock frequency, such as a long string of 0's appended to each block, and a unique synchronization pattern was added to denote the beginning of each data block. Such a synchronization pattern could consist of a period of two or more clocks without a channel transition, which would normally violate the FM encoding rules for real data.

Such a system would suffer from extreme inefficiency, as more than two clock periods would be required to communicate each data bit, leading to a wide required channel bandwidth. The presence of bit jitter on the received transition would make the accurate determination of the correct receive clock frequency very difficult. Such bit jitter problems can be reduced by increasing the number of appended data 0's to the message, to more accurately define the correct receive clock frequency, but this leads to yet further reductions in the scheme's efficiency, in terms of data transmitted versus required channel bandwidth.

The SDIF-2 (Sony Digital Interface Format), the PD (ProDigi) format, and the AES/EBU interface all allow transmission of audio digital data from recorder to recorder. SDIF-2 and PD formats do not include clock information in the data signal, and require a separate connection between devices to accomplish synchronization. Although the AES/EBU interface is self-clocking and self-synchronizing through a single serial interface, it is designed to transmit only 2 channels at a bit rate of 3.072 MHz and a sample rate of 48 kHz. Additionally, the AES/EBU interface uses FM channel code, which has a high overhead (50%) and is designed to transmit over a single twisted wire pair.

It is desirable to be able to send more than two channels of digital audio information between two or more devices without having to provide a separate synchronization channel or connection. Further, it is desirable to have a self-clocking, self-synchronizing interface format with high data efficiency, able to synchronize over a wide range of sampling rates.

SUMMARY OF THE INVENTION

The invention is directed towards a digital audio interface protocol that carries multiple channels of digital audio information serially between a transmitting (master) digital audio tape recorder and a plurality of receiving (slave) recording units. Using a three stage process, the circuitry of the present invention allows the slave VCO's to "lock on" to the transmitting rate of the serial digital data stream without the aid of any explicit sampling information. The interface protocol is adaptable for all types of digital audio applications, including synchronous operation of multiple recording units.

Herein is described a simple means for communicating digital data without prior knowledge of the transmitting station's data rate, provided by a unique synchronization pattern embedded in the transmitted data patterns' format. Also, a means is described that allows a receiving station to infer from the unique synchronization pattern the exact transmitted frequency and phase, over an unlimited range of transmitted data rates.

The present invention describes a novel channel coding scheme and a novel decoding scheme for that channel coding that makes the inference of the correct transmit clock frequency and phase possible at the receive end of the channel. Further, this invention allows the communication of a large data rate over a reasonably small communication channel bandwidth.

In one example, 192 bits of data are transmitted as a group with 256 transmit clocks, constituting a single data 'frame'. The data could represent 12 audio channels of 16 bits quantization each or equivalently 8 channels of 24 bits each. Alternatively, 24 channels of 8 bit audio (voice channels or data bytes) could be transmitted.

The modulation code, and integral synchronization pattern is developed as follows: The 192 data bits are divided into 48 groups of 4 bits each, with a binary '1', appended to the end of each group. The groups are serially transmitted, one at a time, where data ones are each represented by a channel transition, and data 0's are represented by the absence of a transition (in NRZI fashion). The transmission of this data consumes 240 of the 256 channel clocks allotted to a data frame. Subsequently, ten 0's are transmitted (sync pattern), followed by a 1 (sync period terminator), 4 user bits, and a final 1 marking the end of the sequence. The user bits may be used to define the number of channels transmitted. Since the repetition of data frames is frequent and continuous, a single user bit location can be used to communicate a serial bit stream, expressing a single bit per frame.

The interface protocol of the present invention sets up "frames" of digital audio data. Each frame includes a sync word, four user bits, and 8 channels of 24 bit data. The frame begins with a 10-bit sync word consisting of 10 consecutive zeros. After the sync word comes 4 user bits followed by 8*24 digital audio sample bits (192 bits). In the data frame, each group of 4 user or sample bits is preceded and followed by a bit that is always a logical "1". This clocking information insures that at least one "1" is encountered during every 5 bits of the data frame. The interface protocol allows the VCOs of the slave recording units to "lock" onto the sample rate of the data stream without the need for explicit sample rate information.

The synchronization of each receive units' VCO to the sample rate of the data stream is accomplished in three stages. Stage 1 is a "coarse" control. A counter counts the maximum number of consecutive zeros received in the data stream per each frame to locate the 10-bit sync word field. If more than 11 consecutive zeros are counted, the frequency of each receive units' VCO is decreased. If less than 8 consecutive zeros are counted, the frequency of each receive units' VCO is increased. If between 8 and 11 consecutive zeros are counted, the VCO is considered within stage 1 limits, and control of the VCO passes to stage 2.

Stage 2 is a "fine" control that adjusts the frequency of each receive units' VCO so that each receive unit detects 256 clocks for every occurrence of the sync word. A counter counts VCO clocks between consecutive sync words. If more than 257 clocks per sync word are counted, the frequency of the VCO is decreased. If less then 255 clocks are counted per sync word, the frequency of the VCO is increased. If between 255 and 257 clocks per sync word are counted, the VCO is considered within stage 2 limits, and control of the VCO passes to stage 3.

Stage 3 controls the phase of each receive units' VCO. A phase detector compares the phase of the VCO clock to that of the data stream. The output of the phase detector indicates whether the phase of each receive units' VCO is ahead or behind the phase of the data stream, and adjusts the phase of each receive units' VCO accordingly.

The present invention includes circuitry producing two logic outputs (based on the outputs of the three stages) that drive a charge pump used to correct the frequency and phase of each receive units' VCO. The interface protocol allows a receiving unit to derive a clocking signal from the data stream over a wide range of data sample rates.

SUMMARY OF THE DRAWINGS

FIG. 6(A-B) is a flowchart illustrating the operation of the preferred embodiment of the present invention.

DETAILED DESCRIPTION OF THE PREFERRED EMBODIMENTS

The preferred embodiment of the present invention is described. The preferred embodiment discusses a method and apparatus for broadcasting eight channels of 24-bit digital audio data. In the following description, numerous specific details, such as number of channels, number of bits per channel, fiber optic cabling, etc., are described in detail to provide a more thorough description of the present invention. It will be apparent, however, to one skilled in the art, that the present invention may be practiced without these specific details. In other instances, well-known features have not been described in detail so as to not obscure the present invention.

The digital audio data of the preferred embodiment is broadcast in a 256 bit format. Each bit is encoded and its value is determined by the existence or non-existence of a logical level transition (0 to 5 volts or 5 to 0 volts) on the rising edge of a nominal 12.288 MHz clock. A logical level transition is interpreted as a bit value of one, while no transition is interpreted as a bit value of zero.

Since audio data is sent continuously, without pauses or gaps, the present invention includes means in the data format for identifying the beginning of each data sequence (sample), so that the receiver can determine the meaning of each of the different bits. This "sync" pattern is clearly identified and distinguishable from all conceivable data patterns.

The digital input data begins with a 10-bit sync pattern consisting of 10 zeros. Using NRZI coding, the sync word is represented by the absence of data transitions over 10 clock periods. The data bits that follow consist of 4 user bits and 8 channels of 24-bit samples (192 bits). These data bits are modulated such that there is a bit value of 1 for every 5 data bits, thus adding 48 bits to the data. The result is 10 sync bits plus 246 encoded data bits.

In the preferred embodiment, eight channels of 24-bit data are transmitted, totalling 192 bits. One convenient way to drive a digital system uses a clock that is divided by a binary n-bit counter, where n is some integer value. The digital processes operate based upon a signal that the counter generates every time it rolls over. It is therefore advantageous to append enough additional bits to the 192 bits of data to create a "frame" that contains a total number of bits equal to a power of 2. These additional bits consist of clock information and a synchronizing pattern. In the preferred embodiment, 64 additional bits are added to the 192 data bits to produce a sample consisting of 256 channel bits. This conveniently permits an 8 bit counter ($2^8 \times 256$) to be used in the digital logic. Of course, any number of additional bits can be added to the data bits without departing from the scope of the present invention.

Figure 1:
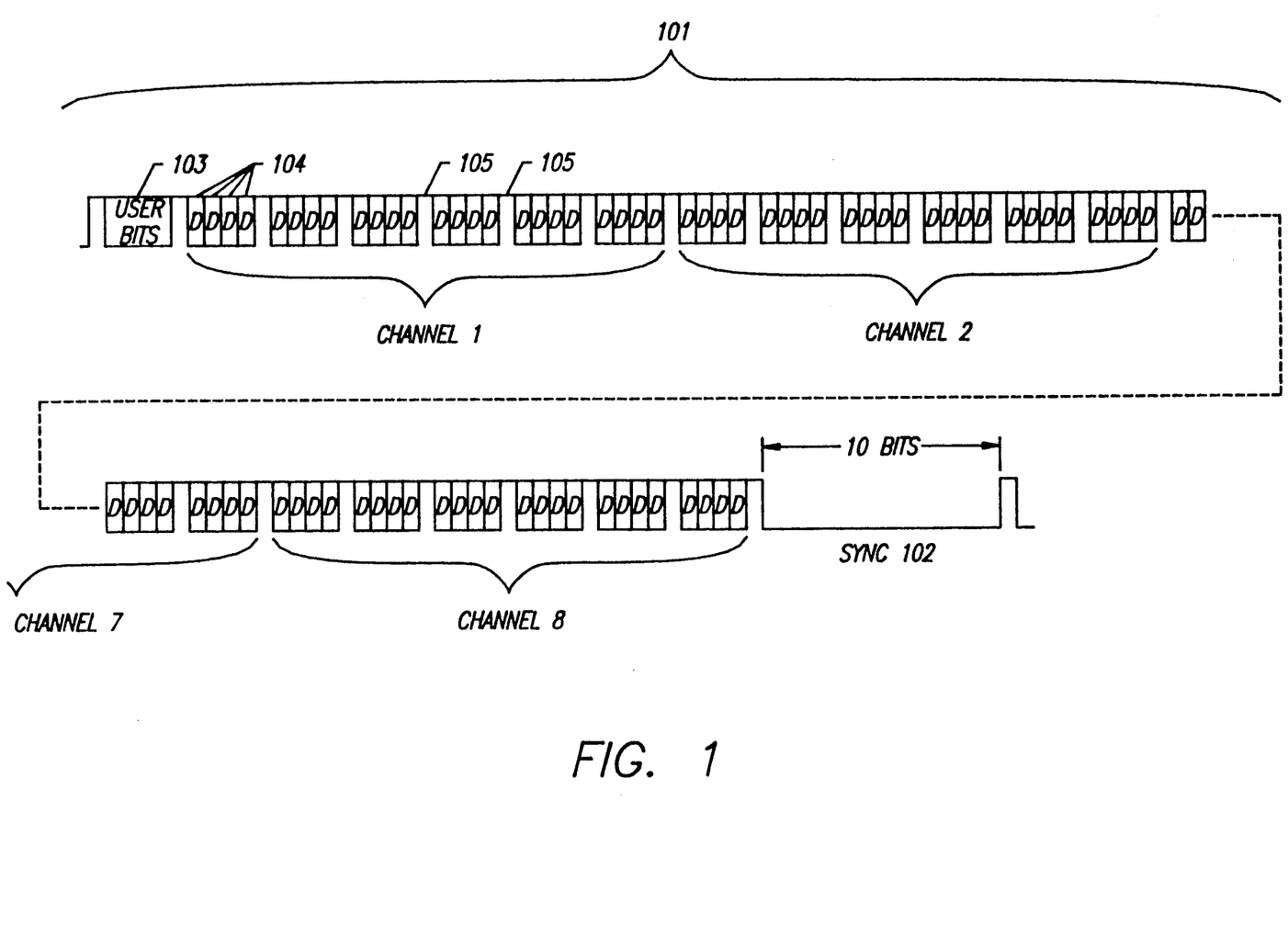
FIG. 1 illustrates a single data frame organized using the present invention.

FIG. 1 illustrates a single frame of data organized using the present invention. The frame 101 is comprised of 256 bits of digital information. Each bit is either a logical one or a logical zero. The first bit (bit 0) and every fifth bit thereafter is a logical one. These clocking bits 105 serve as temporal signposts for the receive logic. Between bit 0 and bit 5 are four user bits 103 that may be used to provide time code, voice data or control information, for example. Between every fifth bit from bit 5 to bit 245 are four digital data bits 104. The data bits 104 represent 8 channels of information (channels 0 through 7), with 24 bit quantization per each channel. Bits 246 to 255, the last 10 bits of data frame 101, are dedicated to the sync pattern 102. In the preferred embodiment, sync pattern 102 is comprised of 10 consecutive logical zeros. Bit 0 of the next data frame 101 is referred to as the sync pattern termination bit because it terminates the 10 consecutive zeros of the sync pattern with a logical one.

The interface protocol of the present invention can be used with any sampling frequency, including the three sampling frequencies recommended by the AES: 32 kHz, 44.1 kHz, and 48 kHz. If each sample period contains 256 channel bits, then 48K samples per second produces a transmit clock of 12.288 MHz. If all of the data bits were ones, the resulting maximum frequency at the receiver would be a 6.144 MHz square wave. Since the Tdhl and Tdlh on a fiber optic cable may not be equal, and some number of zeros are permitted between ones (the data), it is possible to receive patterns where the time periods between ones are not exact multiples of the transmit clock period. This can cause confusion at the receiver, especially at higher data rates, where the clock period approaches the difference in delay time. For the Sharp fiber optic transmitter/receiver pair, the maximum clock rate is about 20 MHz. Some data patterns clocked at a higher rate can become difficult to read with certainty.

To properly receive the data, the receiver logic should include a clock oscillator that can be synchronized to the incoming data rate. This clock is used to drive a shift register that receives its data from the optical receiver. A logical one is inputted if there is a transition at the optical receiver since the last clock pulse, a logical zero if not. Logic can be applied to the system to: (1) synchronize the oscillator, (2) start the shift register, and (3) remove the extra ones in the modulation scheme.

In modems and disk drives that convey data through an analog medium, the data rate is established ahead of receive time, and it is a fairly simple matter to set a VCO close to the receive frequency and allow a phase locked loop to adjust the VCO until phase lock (which implies frequency lock) is achieved. When the receive frequency is unknown, traditional phase locked loops can force the VCO to incorrectly lock onto rational multiples (like ¾ or 5/3) of the transmit clock frequency.

In the preferred embodiment, the present invention receives data over a wide range of sample rates. As a result, traditional phase-locking and synchronizing techniques cannot be used. Instead, the transmitted data has ones inserted in the data stream, but the data bits themselves can be either ones or zeros. The phase detector that synchronizes the receive clock determines phase error at the receipt of a data one, represented by a channel transition. The receive clock runs at a fairly constant rate, so that it is able to function in the presence of zeros, where no transitions occur. At the end of the longest allowed string of zeros, the VCO is still correct within certain limits.

Figure 2A:
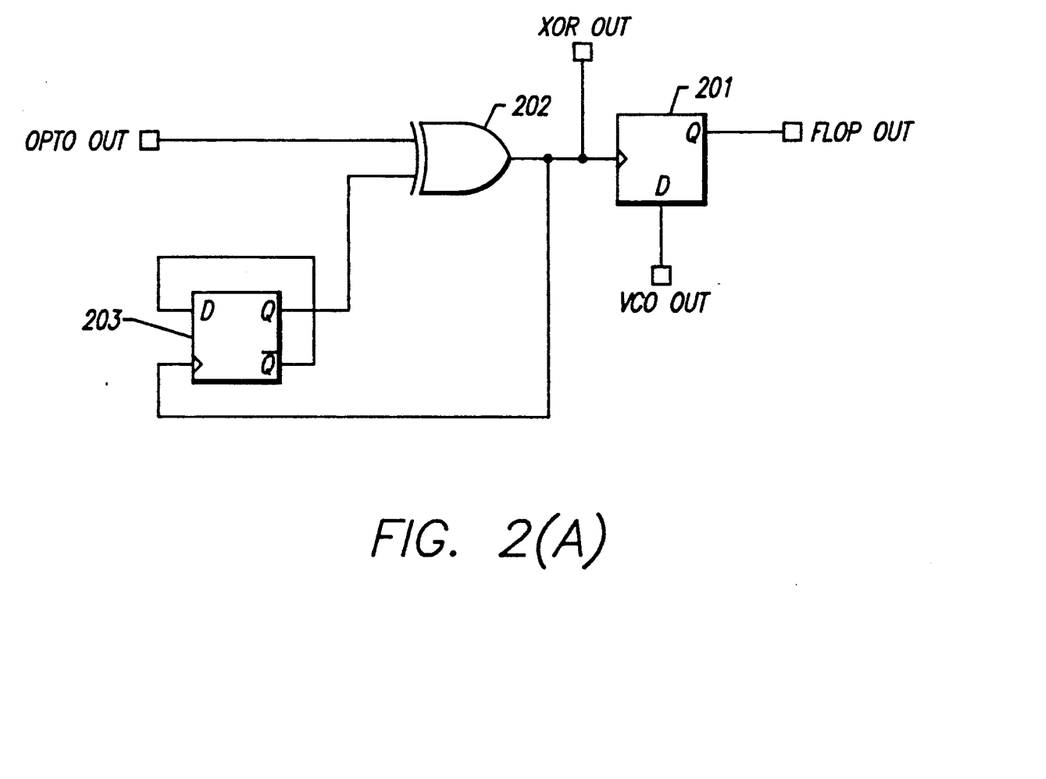
FIG. 2A and 2B illustrate the structure and operation of a simple flip-flop phase detector.
Figure 2B:
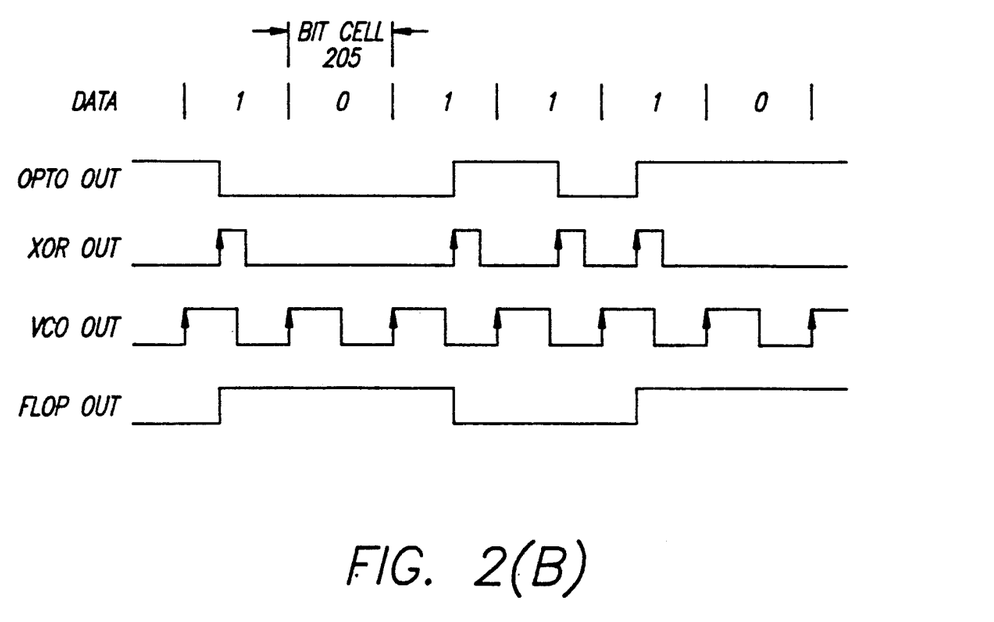

One simple phase detector is a flip-flop. FIGS. 2A and 2B illustrate the structure and operation of a simple flip-flop phase detector. In FIG. 2A, the channel information OPTO OUT from the optical transmission system is XORed at gate 202 with the non-inverted output of flip-flop 203. Flip-flop 203 is clocked by the output of XOR gate 202 (XOR OUT). The inverted output of flip-flop 203 is connected to its data input. XOR gate 202 acts as a pulse generator, and is used to clock flip-flop 201. The output of the VCO (VCO OUT) is coupled to the data input of flip-flop 201. The output of the phase detector is taken from the non-inverted output of flip-flop 201 (FLOP OUT).

FIG. 2B illustrates the operation of the phase detector. The XOR gate 202 outputs a brief positive pulse at each received transition. The receive VCO is coupled to the data input of flip-flop 201. Consequently, flip-flop 201 indicates whether the VCO's phase is ahead or behind the position of the channel transition in OPTO OUT.

The rising edges of the output of XOR gate 202 and the VCO output are marked with arrows as a reminder that these are the points in time where meaningful transitions in the signal can occur. The rising edges of the VCO are coincident with the boundaries of bit cell 205, and any channel transition within these boundaries is interpreted as a one in that VCO cycle. The absence of a transition indicates a zero. If the transmission delay is always constant, the received bits fall in the center of the bit cells 205, but variations in delay due to rise and fall times or unusual data patterns cause the received bits to fall somewhat on either side of the bit cell counter. Excessive bit shift (jitter) can cause the bits to fall outside the bit cell boundaries and lead to receive errors.

XOR gate 202 clocks flip-flop 201, the output of which indicates clock phase error. The falling edges of the clock define the bit cell boundaries, equally-spaced, on both sides of the incoming transition centers. If the output of flip-flop 201 is connected to the VCO, the receive system will tend to force the VCO to a phase relationship with the channel transitions in OPTO OUT, where channel transitions are coincident with the falling edges of the clock.

The output voltage of a typical flip-flop is from 0 to 5 volts. If the VCO is set to run at the correct frequency with an input voltage of 2.5 V, flip-flop 201 alternates high and low in a random pattern, with an average voltage of 2.5 V. Any other average voltage applied to the VCO forces the VCO to a different average frequency, implying a loss of phase lock.

If the VCO runs 10% too fast with a 5 V input, and 10% too slow with a 0 V input, then if 2.5 V is used as an input voltage, the VCO will alternately run at either + or −10% of the correct frequency, with an average that is the correct frequency. Since the frequency of the oscillator is constantly changing, so is its phase, relative to the transmit clock. Because the bit cell boundaries are defined by the clock, they, too, change constantly (clock jitter), with the average being of the correct phase.

If the receive clock drifts in phase by ½ a clock cycle, the clock's rising edges coincides with the center of the received transitions, and the received data has no margin for jitter. With no margin for jitter, the data cannot be reliably received. The maximum allowable jitter can be no greater than ½ a clock period for both the data and the clock, if data is to be reliable. To allow the most margin for jitter, the clock should be very stable.

If the phase of the clock runs 10% too fast or too slow, it will go through a full clock cycle of phase change in 10 clock cycles. In this case, if the interface protocol allowed for 5 continuous zeros, the clock phase could be off by a full half cycle by the time the next channel transition was expected. Flip-flop 201 is set in one of its two possible conditions by the transition that precedes the 5 clockless bit periods, and maintains this state, controlling the VCO, until the next transition is received. In an interface protocol that permits 5 continuous zeros, the VCO has to be limited to a much narrower range to avoid jitter problems.

If one zero is allowed between data bits, as in Frequency Modulation (FM), the total period that the flip-flop could be left unaffected is 2 full clock periods. Using FM encoding, if the phase of the clock runs 10% too fast or too slow, the maximum clock jitter is +/−20% of a bit cell. Since +/−50% of a bit cell represents failure, +/−20% may be an acceptable VCO specification for receiving FM code. In the case of a disk drive, it allows the speed of the drive motor to vary by as much as a few percent (changing the received data rate) without losing data.

The maximum number of continuous zeros in a code is called the run length of the code, and is equal to 1 in FM. In the preferred embodiment of the present invention, the run length is 4. In other words, 4-bits of data are separated by intentionally placed ones, limiting the maximum run length and providing clock information. The 192 bits of data are grouped into 48 quadruplet bit groups. As shown in FIG. 1, the addition of a 1 to the beginning of each 4-bit group produces 48 quintuple bit groups, or 240 bits total. Out of the allowed 256 bits per frame, 16 extra bits remain for special user bits and a synchronization pattern.

The 16 bit space contains a defined sync period 102 (a defined length assists in clock frequency control), and user bits 103 that may ultimately carry control information, voice data, or time code. In the preferred embodiment, these user bits occupy the first 6 positions in the 16 bit space, (preceded and followed by ones) leaving a 10 bit sync period.

In the preferred embodiment, the receive VCO can lock onto and receive data at sample rates ranging from 32 kHz to 64 kHz. At 256 bits per frame, this corresponds to channel clock frequencies of 8.192 MHz to 16.384 MHz. Thus, using the preferred embodiment, the optical system's minimum signal rate requirement of 100 kHz is satisfied.

When the interface of the preferred embodiment is first connected between the transmit and receive devices, the receive VCO must be able to immediately adjust in both frequency and phase to the incoming data pattern. One unambiguous synchronization pattern that provides information about sample rate is a long run-length violation of many zeros in the sync pattern area. In the preferred embodiment, the 10 bit sync word is comprised of 10 consecutive zeros.

Figure 3:
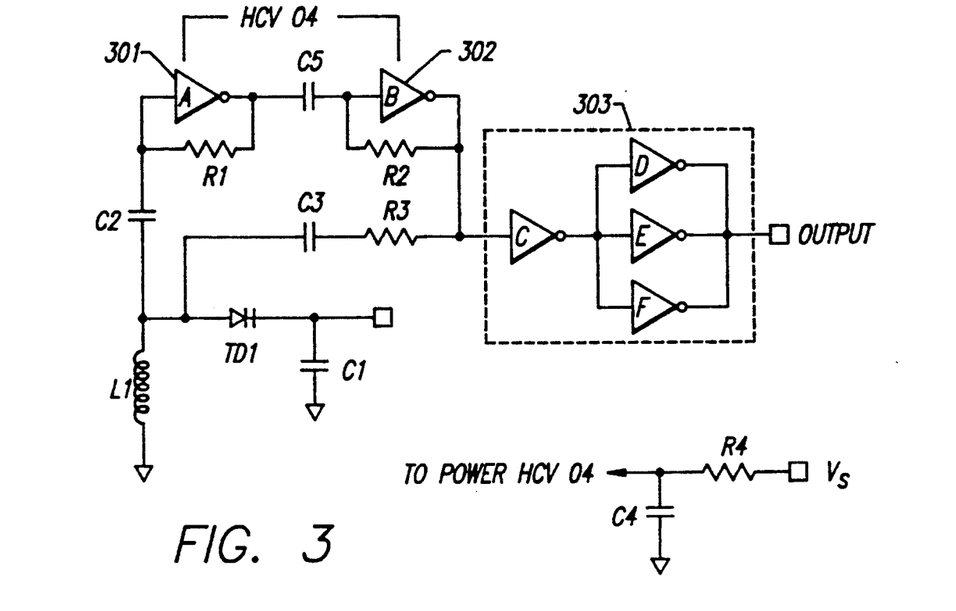
FIG. 3 illustrates a VCO for use in the preferred embodiment of the present invention.

Many VCOs are currently available. One VCO that is quite stable utilizes a varicap tuning diode and an inductor. This relatively simple oscillator circuit provides a 50% duty cycle output at frequencies exceeding 20 MHz. FIG. 3 illustrates a VCO for use in the preferred embodiment present invention. Capacitor C1 is coupled between the VCO input and ground. The first terminal of varicap tuning diode TD1 is coupled to the VCO input and the other terminal is coupled to the first terminals of capacitors C2 and C3, and inductor L1. The second terminal of inductor L1 is coupled to ground. The second terminal of capacitor C2 is coupled to the first terminal of resistor R1 and to the input of the HCU04, comprised of inverters 301 and 302. The second terminal of capacitor C3 is coupled to the first terminal of resistor R3. The second terminal of resistor R3 is coupled to the output of the HCU04, the second terminal of resistor R2, and to the input of inverter series 303. The second terminal of resistor R1 is coupled to in the output of inverter 301 and to the first terminal of capacitor C5. The second terminal of capacitor C5 is coupled to the input of inverter 302 and to the first terminal of resistor R2. The output of the VCO in FIG. 3 is taken from the output of inverter series 303.

Some tuning diodes have a capacitance range of approximately 16 to 1. One such tuning device, the Motorola MVAM108, shows a capacitance of about 500 pf at 1 volt. Since the frequency of the circuit is inversely proportional to the square root of capacitance, the frequency range of such an oscillator is as much as 4 to 1.

Power supply VS is coupled through resistor R4 to the first terminal of capacitor C4 and to inverters 301 and 302. The second terminal of capacitor C4 is coupled to ground. The resistor R4 in series with the voltage supply limits the current that can be drawn, since the HCU04 is operated in its linear mode, requiring considerable supply current. All of the capacitors in the VCO circuit are ceramic or monolithic parts in the preferred embodiment. Feedback capacitor C3 and resistor R3 are adjusted to obtain a constant RF voltage at the top of the inductor, over the full range of control voltages (approx. 1 V). The inductor should be a resistor-like part, with a Q value in the range of 50 or greater.

The VCO of FIG. 3 has a frequency range of approximately 4 to 1. If the flip-flop phase detector of FIG. 2 is used to control the VCO, the VCO's phase changes with each passing cycle, and the phase detector, with a 0 to 5 volt output range, is unable to deliver the full 0 to 8 volts required to achieve a 4 to 1 frequency range. Further, bypass capacitor C1 at the input of the VCO (necessary for operation) presents a substantial load to flip-flop 201.

In the preferred embodiment, C1=1500 pf, C2=22 pf, C3=10 pf, C4=0.1 $\mu$f, C5=10 pf, L1=680 nH, R1=R2=100 k$\Omega$, R3=3.3 k$\Omega$, and R4=20 $\Omega$. Of course, these values are given for purposes of example only. It will be apparent to one skilled in the art that other component values, or even an entirely different variable VCO structure, may be used with the present invention without departing from the spirit and scope of the present invention.

Figure 4:
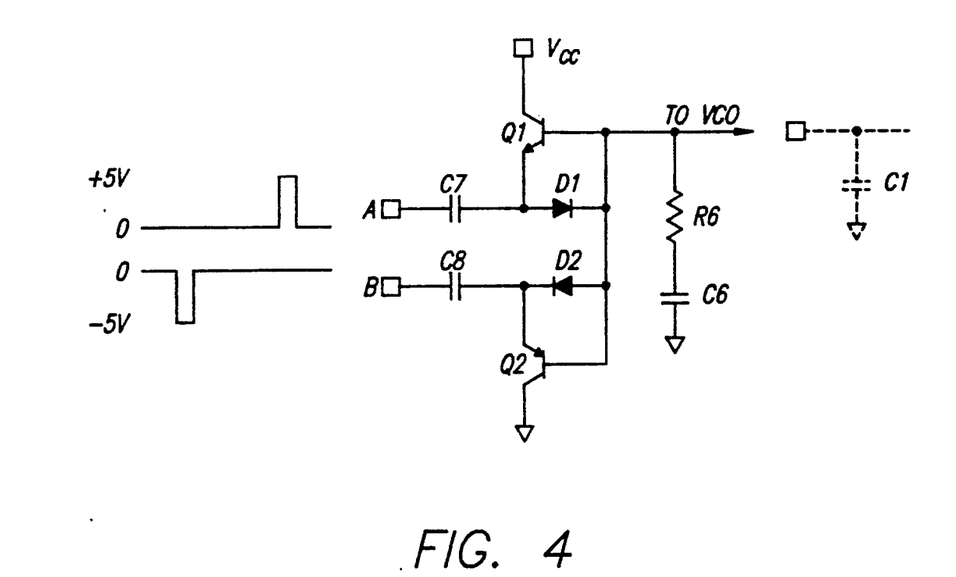
FIG. 4 illustrates a charge pump for use in the preferred embodiment of the present invention.

FIG. 4 shows a charge pump circuit that uses general purpose transistors, two diodes, and a pair of capacitors to allow 0 to 5 volt logic levels to affect the VCO over a 0 to 5 V range. The first terminal of capacitor C7 is coupled to input terminal A, and the second terminal of capacitor C7 is coupled to the input terminal of diode D1 and the emitter of n-type transistor Q1. The collector of transistor Q1 is coupled to voltage supply VCC. The first terminal of capacitor C8 is coupled to input terminal B, and the second terminal of capacitor C8 is coupled to the output terminal of diode D2 and the emitter of p-type transistor Q2. The collector of transistor Q1 is coupled to ground. The bases of transistors Q1 and Q2, the output terminal of diode D1, and the input terminal of diode D2 are all coupled to the output of the charge pump circuit, as well as to the first terminal of resistor R6. The second terminal of resistor R6 is coupled to ground through capacitor C6. The output of the charge pump circuit is coupled to the input of the VCO.

In the preferred embodiment of the present invention, C7=C8=33 pf, C6=0.33 $\mu$f, and R6=100 $\Omega$.

The circuit has two logic inputs: Input A receives a brief positive 5 V pulse to increase the control voltage (increasing VCO frequency), and input B receives a brief negative 5 V pulse to lower the control voltage (decreasing VCO frequency).

The leakage current of the tuning diode is small. The control voltage is stored on bypass capacitor C1, and modified by the charge pumping behavior of the capacitors, transistors and diodes. To understand the circuit's operation, imagine the voltage on capacitor C1 is 4 volts. Input A is normally low, and capacitor C7 will have about 4 volts across it. When input A goes high, the voltage across the capacitor C7 changes to 1 volt, of opposite polarity. This voltage change requires additional current, supplied from the driving circuit, through diode D1, and into capacitor C1, adding slightly to the charge of capacitor C1. When input A falls (maybe 100 nsec later), the voltage across the capacitor C7 changes back to almost its original 4 V value. The current to do this is delivered through the transistor at this time, and the resulting current in this phase of operation barely affects the charge stored on capacitor C1.

Each time input A goes high, capacitor C1 has a slight amount added to its charge, resulting in a step change in voltage of about 12 millivolts. The operation of input B is substantially identical to that of input A, except that the polarity is reversed.

When the circuit is operating, the charge on capacitor C1 is continuously modified by the action of the A and B inputs, forcing the VCO to the correct frequency. At the predetermined clock and data rates, the charge currents occur frequently enough to control the VCO, in spite of the small amount of leakage in the varicap.

Resistor R6 in series with the capacitor C6, connected at the output of the phase detector, allows the system to be stable. Since phase is the integral of frequency in the VCO, and the charge pump essentially integrates pumped charges, the combination of the VCO and the charge pump leads to conditional stability. The series resistor and the capacitor tend to further stabilize the system.

A phase compensation pulse is derived each time a phase error is detected. In the absence of the capacitor C6, if all of these pulses were added to capacitor C1, the frequency of the VCO would change at each step. When the VCO phase finally became correct, the frequency would be too far shifted by all of the accumulated charges. Consequently, the reverse process would take place, with a series of similar, but opposite polarity charges.

If just one pulse is applied, capacitor C1 initially is charged by about 12 millivolts, but the capacitor C6 remains at the starting voltage, prior to the charge pulse. In time, the 12 mV addition to capacitor C1 partially drains into capacitor C6 through resistor R6

(TC=330 nsec). The ultimate change in control voltage is only about 3 mV, but the phase shift (in the required direction) during the period that the control voltage was peaked at 12 mV is sufficient to add phase correction but only slightly affects long term frequency.

Figure 5:
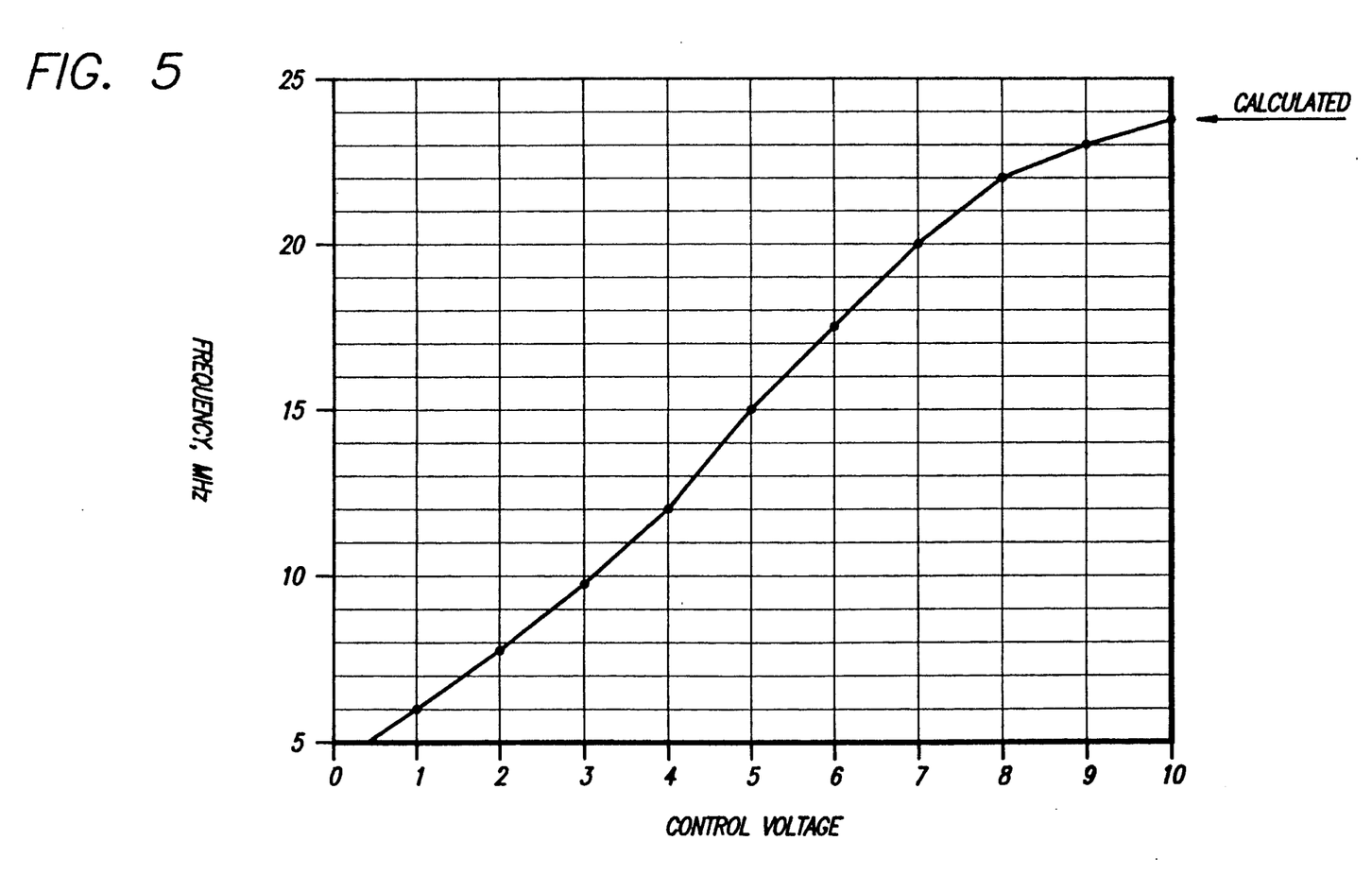
FIG. 5 shows a graph of expected frequency vs. voltage for the VCO of FIG. 3.

FIG. 5 shows a graph of expected frequency versus voltage, calculated from the varicap data sheet values. Some allowance was made for feedback, coupling and stray capacitances. As illustrated in FIG. 5, a 1 volt step, from 1 volt to 2 volts, corresponds to about a 30% change in frequency at the low end of the control range, while the same size step, from 6 to 7 volts, corresponds to about a 14% change in frequency at the upper end.

Averaging these values gives a 22% per volt VCO constant. Assuming linearity, a 3 millivolt step changes the VCO frequency by about 0.06 percent.

If the VCO in FIG. 3 and the charge pump in FIG. 4 are used to phase lock to a data steam, and the VCOs control voltage is set just one 3 mV step off, and initially its phase was correct, about 800 clock cycles would be required for the phase to drift the allowable maximum of 50% of a clock period. Using this technique, and allowing a long run length violation of 10 zeros as a synchronization pattern, the VCO could not be more than 1% of a clock cycle off at the end of the sync pattern, an extremely small and acceptable amount of clock jitter.

If the initial VCO frequency is 1% off from the correct receive clock rate, then the receive VCO will drift, relative to the transmit clock, at such a rate that 25 VCO clocks pass in the time required for the phase relationship to change by ½ a clock cycle. Using the present invention, where the maximum run-length is 4, during 25 clock cycles a minimum of 5 channel transitions would be received. If the phase detector applies a correcting pulse to the receive VCO for each of these 5 transitions, each correcting the frequency by .06%, a 0.3% long-term frequency change is achieved. Coupled with the 1% transient frequency change, the correction would be sufficient to enable the phase change to be constant (if two frequencies are the same, they have a constant, but not necessarily identical, phase relationship). From this point on, the system can deliver further phase clocking pulses to the VCO to achieve phase lock with the transmit clock, ultimately bringing the long-term receive VCO frequency to the correct value.

A means is now described for recognizing the sync pattern of the preferred embodiment, and for setting the VCO to within 1% of the correct frequency, so that a phase detector can take over control and cause the VCO to lock to the data stream.

The sync pattern of the preferred embodiment is terminated by the sync pattern termination bit, as shown in FIG. 1. If the sync pattern is detected using a run length violation detector, this first 'post sync' transition serves as a timing marker. In the preferred embodiment, this post sync timing marker occurs once every 256 VCO cycles, if the frequency is correct. Although circuitry can be derived to control the receive VCO to meet this end, reliable sync period detection is still required.

The receive VCO of the preferred embodiment has a potential range (after production tolerances) of over 4 to 1 in frequency. Using the component values given above, the expected output range should be from 5 MHz to 25 MHz. If the incoming signal is at a 32 kHz sample rate (8.192 MHz transmit clock), and the receive VCO is at the upper limit (25 MHz, ratio=3.05:1), then the sync period (10 zeros, 11 clock periods of time) is received as over 33 consecutive zeros, indicating that the receive clock rate is too high. On the other hand, if the data is transmitted at 64 kHz (16.384 MHz transmit clock), and the VCO receive clock started up at 5 MHz (ratio=3.3:1), the same 10 zero sync pattern is received as approximately 4 consecutive zeros, indicating that the receive clock frequency is too low.

As the transmitted data could be all 1's, all 0's, or a mixed combination of the two, the inclusion of a data 1 at the end of each group of 4 bits provides sufficient transmit clock information for the receive clock to acquire synchronization. Although the frame sync period of ten 0's provides the opportunity for the receive clock to fall out of lock, it is sufficiently short and infrequent to not pose a problem. The sync period however, is sufficiently long so that, even in the case of transmitting a message containing 0's is unambiguously identifiable.

When the receiver first attempts to decode the incoming digital message, it has no prior knowledge of the data rate, and therefore, neither the transmitter's clock frequency or phase. The receiver has incorporated into it a voltage controlled oscillator, that the receiver decoding circuitry can use to bring the receive VCO into frequency and phase lock with the transmitter, using the data frame's sync pattern as a reference.

Initially, the receiver VCO is not in phase with the incoming data pattern, as the frequencies of the transmitter clock and the receive VCO could be widely different. As a result of this unpredictable frequency discrepancy, the frame sync period will appear to be any number of receive clock periods long. Even if the receive VCO is running at the correct frequency, since it is not in phase lock, and the received data transitions are subject to some expected, random, temporal jitter, the ten (transmit) clock period frame sync pattern could appear at the receiver to be as few as 9 or as many as 12 receive clocks in length. Controlling the receive VCO until the apparent sync period is of the expected length (10 clocks) would be difficult or impossible, due to the random and unpredictable phase relationship of the transmit and receive clocks. Further, the accuracy to which the receive clock could be controlled when using the sync period as a measure of clock frequency is too crude to begin normal phase comparison between the data transitions and the receive clock. The receive clock inaccuracy would be beyond the capture range of the receive phase locked loop.

In the preferred embodiment three stages are used in combination to align the frequency and phase receive VCO. The first stage must bring the VCO to within a close enough frequency so that the second stage may recognize the sync pattern and establish a 256 clocks per sync period relationship. The third stage then attempts to phase lock the VCO.

Accordingly, the preferred embodiment of the present invention uses three techniques in combination to properly align the frequency of the receive VCO:

1. Adjust the receive VCO such that the sync period appears to be sufficiently close to the target of ten receive clocks that the sync pattern can be unambiguously identified and not confused with normal data patterns;

2. Adjust the receive VCO so that the number of receive clocks that transpire between sync terminator transitions is sufficiently close to the correct number of 256 so that the phase locking mechanism can capture;

3. Phase lock the receive VCO in normal fashion.

The first step brings the receive VCO close enough to the transmit frequency to permit the second step to recognize the sync pattern and establish the 256 clocks per sync pattern relationship. Since the third step may actually skip a clock pulse attempting to phase lock, the second stage should stop correcting the VCO when it is between 255 and 257 clocks per sync, inclusive, and allow the third stage to take over control of the VCO. This hierarchy assures that the receive VCO is within $+/-1\%$ of the correct frequency when the third stage attempts to phase lock.

Since the data may jitter considerably within the bit cell window, it may be difficult to recognize when phase lock is achieved. However, assuming that the VCO frequency is within the limits of the second stage, so that the VCO is within 1% of the correct frequency, phase lock using the third stage is inevitable. Correspondingly, a signal should be sent to the receive logic to indicate when the receive VCO frequency is within stage 2 limits; that is, when the system is very likely phase locked, and the data is reliable.

The 256 bit frame of the preferred embodiment is structured such that the maximum number of ones in any one frame is 246 and the minimum number of ones is 50, depending on the one's content of the data channel. An 8 bit transition counter is incremented at the receipt of each channel transition, so that at least one and as many as five complete frames will be received each time the 8 bit counter rolls over. Similarly, at least one and as many as five sync patterns is received between transition counter rollovers.

Another counter is arranged to count the number of continuously received zeros (driven by the receive VCO), and the maximum count is made to set flip-flops, depending on established limits (i.e., maximum of 12, minimum of 8 continuous zeros). The values of these flip flops are clocked into registers at the rollover of the transition counter to indicate the degree and direction of any gross VCO error. If the continuous zero count got to eight, but never got to 13, then the VCO is within stage 1 limits, and control is passed to stage 2.

Stage 2 consists of a sync terminator bit detector and a 9 bit VCO counter. The sync terminator detector outputs a pulse when the first transition is received after a run of at least 8 zeros. When this pulse is received, the VCO counter is evaluated and reset. The VCO counter counts the number of receive VCO periods since the last sync terminator bit. The value in the VCO counter, prior to reset, determines if the VCO is out of frequency lock range. Because the sync terminator detector output marks the beginning of the data sequence, it is useful in the receive logic that converts the received data into usable information.

The second stage detector outputs a signal to the receive logic to indicate phase lock, delaying the signal by at least one transition counter rollover to give stage 3 adequate time to guarantee lock.

The order of priority of the three stages favors the first stage, then the second, and then the third, the phase locking stage, since if the VCO is out too far out of bounds, stages 2 and 3 can cause erroneous operation of stage 1.

FIG. 6 is a flowchart illustrating the operation of the preferred embodiment of the present invention. At step 601, the digital information is fed to the receive device, typically through an interface of some type. At step 602, stage 1 operation begins. At step 603, the interface circuitry counts the maximum number of zeros received that are terminated by a data one. At decision block 604 the question is asked, "Less than 8 zeros?" If the answer is yes, the system waits for the next frame counter rollover at step 605, sends control signals to increase the frequency of the receive VCO at step 606, resets the consecutive zero counter at step 607 and repeats stage 1 operation at step 602. If the answer is no, the question is presented at decision block 608, "More than 11 zeros?" If the answer is yes, the system waits for the next frame counter rollover at step 609, sends control signals to decrease the frequency of the receive VCO at step 610, resets the consecutive zero counter at step 607 and repeats stage 1 operation at step 602. If the answer is no, the system enables stage 2 circuitry at step 611 and begins stage 2 operation at step 612.

At step 613, the system counts the number of receive VCO clocks between receptions of the sync pattern. At decision block 614, the question is asked, "less than 255 clocks?" If the answer is yes, the VCO counter is reset at step 615 and control signals are sent to increase the receive VCO frequency at step 616. If the answer is no, the question is presented at decision block 617, "More than 257 clocks?" If the answer is yes, the VCO counter is reset at step 618 and control signals are sent to decrease the receive VCO frequency at step 609. If the answer is no, the system enters stage 3 operation at step 620.

At decision block 621 the question is asked, "Within stage 1 limits?" If the maximum number of consecutive zeros received per frame counter rollover is outside the acceptable limits of stage 1 operation ($<8$ or $>11$), control returns to stage 1 at step 602. If the number of consecutive zeros is still within the limits of stage 1 ($>7$ and $<12$), the system asks the next question at decision block 623, "Within stage 2 limits?" If the number of VCO clocks received per sync pattern occurrence is outside the acceptable limits of stage 2 operation ($<255$ or $>257$), control returns to stage 2 at step 612. If the number of VCO clocks is still within the acceptable limits of stage 2 operation ($>254$ and $<258$), control passes to step 625.

At step 625 the phase of the receive VCO is compared with the phase of the digital data signal. At decision block 626 the question is presented, "VCO's phase behind?" If the answer is yes, a control pulse is sent to the input of the receive VCO at step 627 to increase the phase of the VCO, and operation continues at step 620. If the answer is no, the question is asked at decision block 628, "VCO's phase ahead?" If the answer is yes, a control pulse is sent to the input of the receive VCO at step 629 to decrease the phase of the VCO, and operation continues at step 620. If the answer is no, the system transmits a signal at step 630 indicating that phase lock has been achieved, and control passes to step 620 to maintain phase-locked operation.

Figure 7:
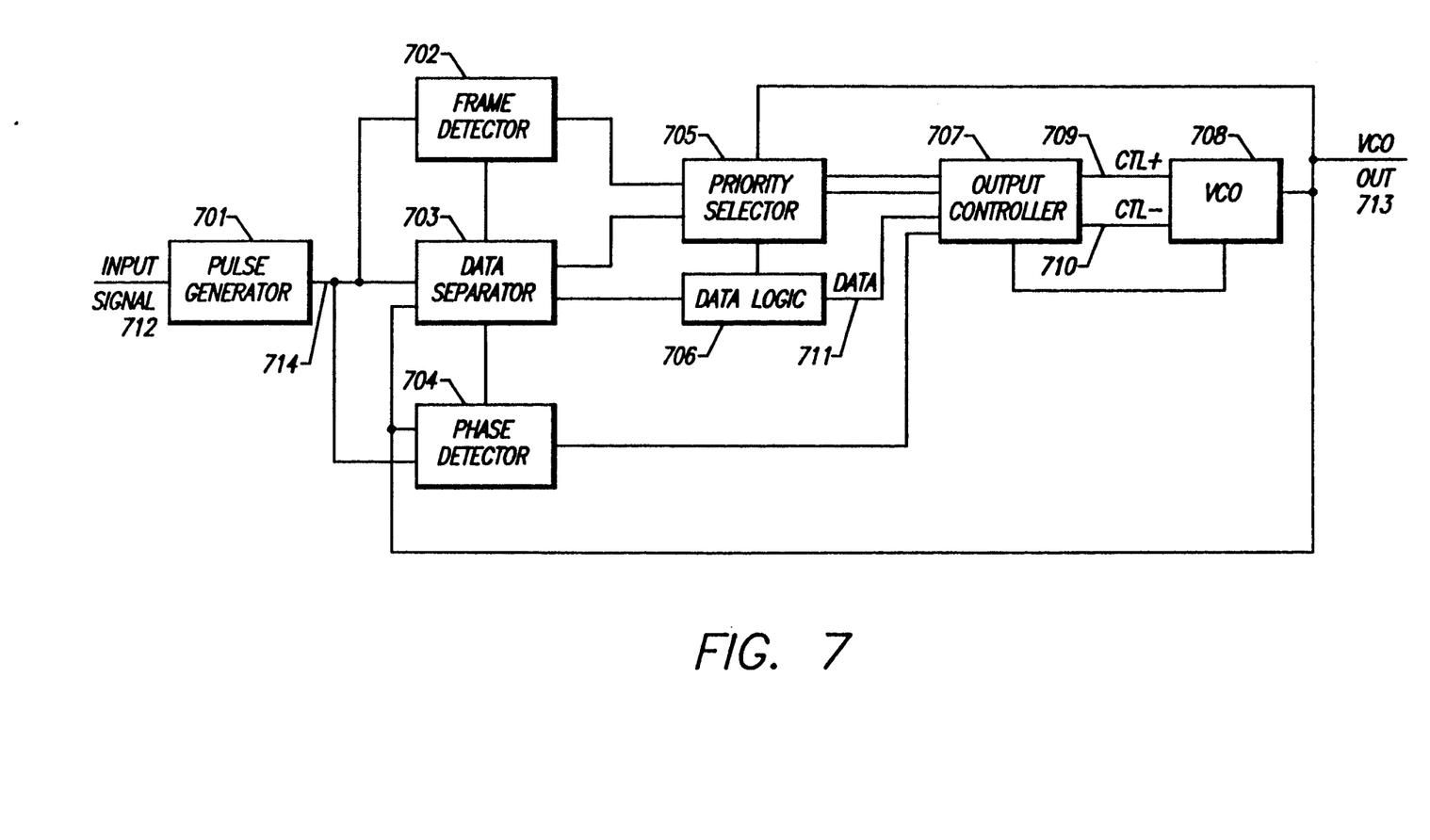
FIG. 7 illustrates a block diagram of one system for implementing the preferred embodiment of the present invention.

A block diagram of one system for implementing the preferred embodiment of the present invention is illustrated in FIG. 7. The digital data signal 712 is connected to the input of pulse generator 701. Pulse generator 701 receives the NRZI digital data signal from the interface transmission system and outputs a pulse every time it detects a transition in signal 712. The output of pulse generator 701 is coupled to frame detector 702, data separator 703 and phase detector 704. Frame detector 702 monitors the number of transitions in the data signal 712, and outputs a signal after every 256 transitions. Data separator 703 takes pulse output 714 and separates the data information from the clocking information, converting the clocking information into logic levels for use by priority selector 705. Phase detector 704 compares the phase of pulse output 714 with that of VCO output 713, and outputs a signal indicating whether VCO output 713 is ahead or behind in phase.

Priority selector 705 is coupled to frame detector 702 and data separator 703, as well as data logic 706 and VCO output 713. Priority selector 705 determines whether the receive VCO 708 is within stage 1 or stage 2 limits, and outputs to output controller 707 a signal indicating the current stage and the required direction of frequency correction for VCO 708. Output controller 707 decodes the information from priority selector 705, data logic 706, and phase detector 704, and issues control pulses via lines 709 and 710 to VCO 708 to adjust the frequency and phase of the oscillator. VCO output 713 is used to clock digital data input signal 712 to decode the digital information.

In the preferred embodiment, the receive VCO is controlled through two logic outputs that drive the charge pump. During Stage 1 or stage 2 correction, the pulse duration of the A and B outputs can be very long, since a correction pulse occurs every 256 channel transitions or at the receipt of each sync terminator bit. For this purpose, the pulse can be several VCO clocks long. On the other hand, in the phase locking stage, stage 3, a pulse is expected at each channel transition, so the correction pulse should be narrow (less than one transition wide).

During lock, the VCO in the preferred embodiment runs at a maximum frequency of 16.384 MHz, with a period of 61 nsec. The A and B signals may be a gated version of the VCO, giving a 30 nsec pulse. For capacitor C7 to be charged or discharged by 5 volts during this short time period, a significant impulse current must be delivered. This current could be lowered and spread over a longer time by placing a resistor in series with the capacitor, but for the peak current to be lowered to reasonable levels (like 10 mA), the resistor would have to be as large as 470 ohms. This would cause a 47 nsec time constant with a value of 100 pf for capacitor C7, and in a 30 nsec half-clock, the charge would only be partially conducted to the VCO input capacitor.

This is particularly the case at high VCO frequencies, where the VCO sensitivity to control voltage is at a minimum. For best operation, the VCO voltage-to-frequency characteristic should be exponential, where locking characteristics are constant over the entire VCO range. Purposefully limiting the A and B pin input currents causes an extra non-exponentiality at high VCO frequencies.

Thus, a digital audio data format and apparatus that is auto-clocking and auto-synchronizing is described.

We claim:

1. A method for asynchronous communication of digital data at a plurality of data rates, said method comprising the steps of:
    encoding digital information into a plurality of data frames each having a sync pattern and a plurality of valid data bits;
    transmitting said plurality of data frames using a communications medium;
    receiving said plurality of data frames using a receive oscillator having a frequency and detecting said sync pattern of each of said data frames;
    counting a number of periods of said oscillator during detection of each sync pattern;
    executing a first adjustment of said frequency of said receive oscillator, based upon said number of oscillator periods counted;
    executing a second adjustment of said frequency of said receive oscillator such that the number of receive oscillator periods that elapse between occurrences of said sync pattern is within a range of the number of bits in said data frame allowing a phase locking means to phaselock said receive oscillator to said digital data; and,
    phase locking said receive oscillator to said digital data.

2. The method of claim 1 wherein a data frame comprises 256 bits.

3. The method of claim 2 wherein said data frame comprises 48 groups of 4 bits, each followed by a binary one, a sync pattern of ten consecutive binary zero's, a sync period terminator bit, 4 user bits, and an end of sequence bit.

4. The method of claim 1 wherein said first adjustment of said frequency is such that at least 8 bits and no more than 11 consecutive zero's of said sync pattern are detected.

5. The method of claim 1 wherein said second adjustment of said frequency is such that at least 255 bits and no more than 257 clocks are counted between occurrences of said sync pattern.

6. The method of claim 1 wherein said step of phase locking is accomplished using a phase lock loop having a phase detector that compares the phase of said data with the phase of said receive oscillator.

7. A circuit for asynchronous communication of digital data at a plurality of data rates, comprising;
    a digital transmitter coupled to a transmission means, said digital transmitter transmitting a series of data frames, each of said data frames comprised of said digital data and a sync pattern;
    a digital receiver coupled to said transmission means, said digital receiver capable of locating said sync pattern within each of said data frames based upon an output of an oscillator;
    a counting means for counting a number of oscillator periods;
    said oscillator executing a first adjustment of its frequency until the number of oscillator periods counted during said sync pattern is within a first stage range, allowing said digital receiver to recognize said sync pattern.
    said oscillator executing a second adjustment of its frequency until the number of oscillator periods occurring in one dataframe is within a second stage range, making said oscillator capable of being phaselocked to the transmitted dataframes.
    phase locking means to lock said oscillator to said transmitted data frames.

8. The circuit of claim 7 wherein a data frame comprises 256 bits.

9. The circuit of claim 8 wherein said data frame comprises 48 groups of 4 bits, each followed by a binary one, a sync pattern of ten consecutive binary zero's, a sync period terminator bit, 4 user bits, and an end of sequence bit.

10. The circuit of claim 7 wherein said first adjustment of said frequency is such that at least 8 bits and no more than 11 consecutive zero's of said sync pattern are detected.

11. The circuit of claim 7 wherein said second adjustment of said frequency is such that at least 255 bits and no more than 257 clocks are counted between occurrences of said sync pattern.

12. The circuit of claim 7 wherein said phase locking is accomplished using a phase lock loop having a phase detector that compares the phase of said data with the phase of said receive oscillator.

13. A method for phase locking an oscillator to the transmit frequency of a series of data frames, each data frame comprising N bits of binary data, each data frame further comprised of a sync pattern and a plurality of digitally sampled bits, said sync pattern comprised of a plurality of consecutive identical binary bits terminated by a single termination bit, said method comprising the steps of:

(a) transmitting said series of data frames from a digital transmitter to a digital receiver;
(b) locating said sync pattern in each data frame;
(c) interpreting said sync pattern using a counter based on an output signal of an oscillator having a frequency;
(d) increasing said frequency of said oscillator if said sync pattern is interpreted as having less than a first lower limit of consecutive identical binary bits;
(e) decreasing said frequency of said oscillator if said sync pattern is interpreted as having more than a first upper limit of consecutive identical binary bits;
(f) repeating steps (b) through (e) until no frequency adjustment of said oscillator is required in step (d) or step (e);
(g) counting a number of oscillations of said oscillator between consecutive occurrences of said sync pattern;
(h) increasing said frequency of said oscillator if said number of oscillations of said oscillator is less than a second lower limit;
(i) decreasing said frequency of said oscillator if said number of oscillations of said oscillator is more than second upper limit;
(j) repeating steps (g) through (i) until no frequency adjustment of said oscillator is required in step (h) or step (i);
(k) comparing a phase of said oscillator with a phase of said transmit frequency of said data frames;
(l) advancing said phase of said oscillator if said phase of said oscillator is behind said phase of said transmit frequency of said data frames;
(m) retarding said phase of said oscillator if said phase of said oscillator is ahead of said phase of said transmit frequency of said data frames;
(n) repeating steps (k) through (m) until no phase adjustment is required in step (l) or (m).

14. The method of claim 13 wherein a data frame comprises 256 bits.

15. The method of claim 14 wherein said data frame comprises 48 groups of 4 bits, each followed by a binary one, a sync pattern of ten consecutive binary zero's, a sync period terminator bit, 4 user bits, and an end of sequence bit.

16. The method of claim 13 wherein said first lower limit comprises 8 bits.

17. The method of claim 13 wherein said first upper limit comprises 11 bits.

18. The method of claim 13 wherein said second lower limit comprises 255.

19. The method of claim 13 wherein said second upper limit comprises 257.

* * * * *

UNITED STATES PATENT AND TRADEMARK OFFICE
CERTIFICATE OF CORRECTION

PATENT NO. : 5,297,181
DATED : March 22, 1994
INVENTOR(S) : BARR, Keith et al.

Figure 6A:
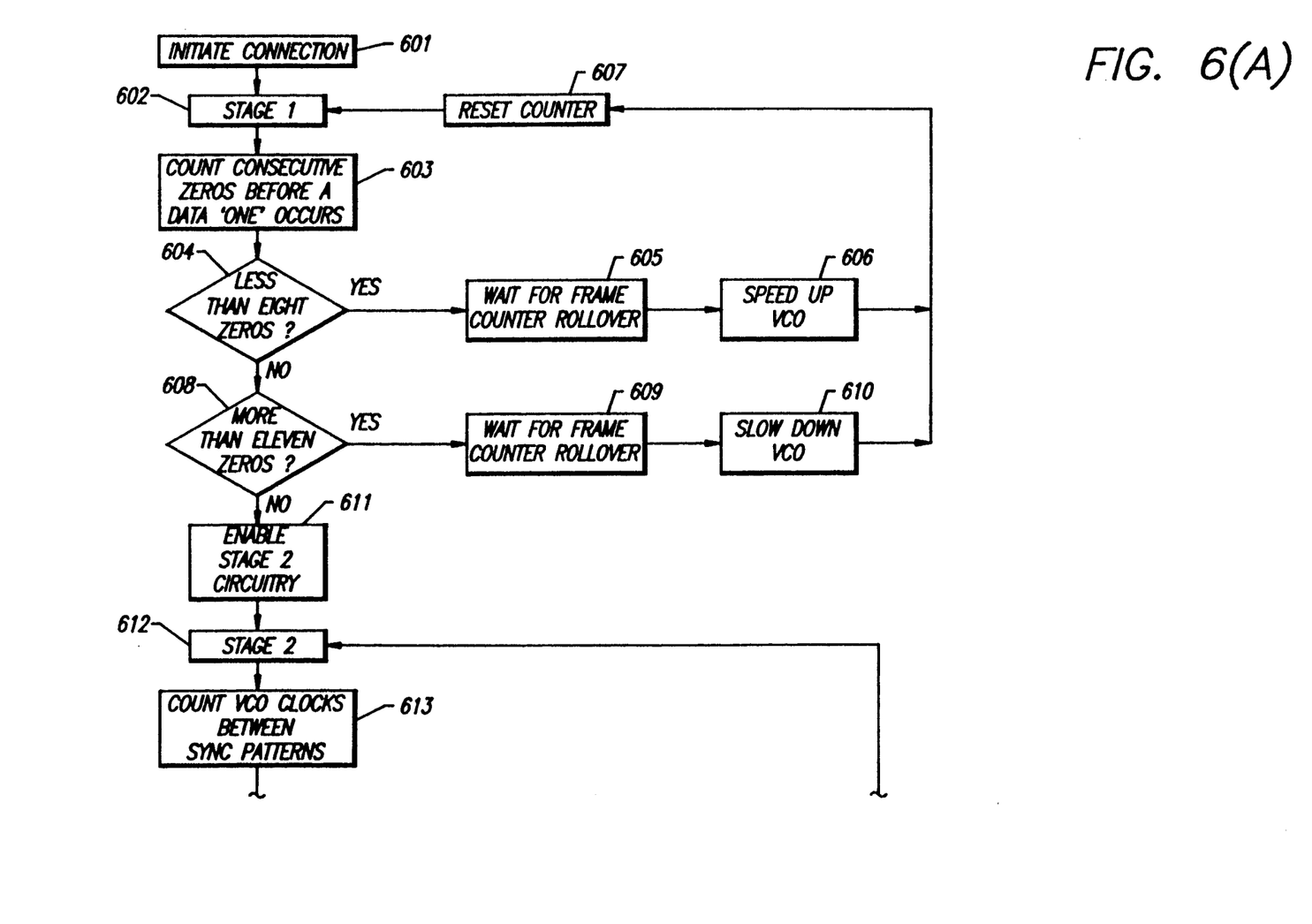
Figure 6B:
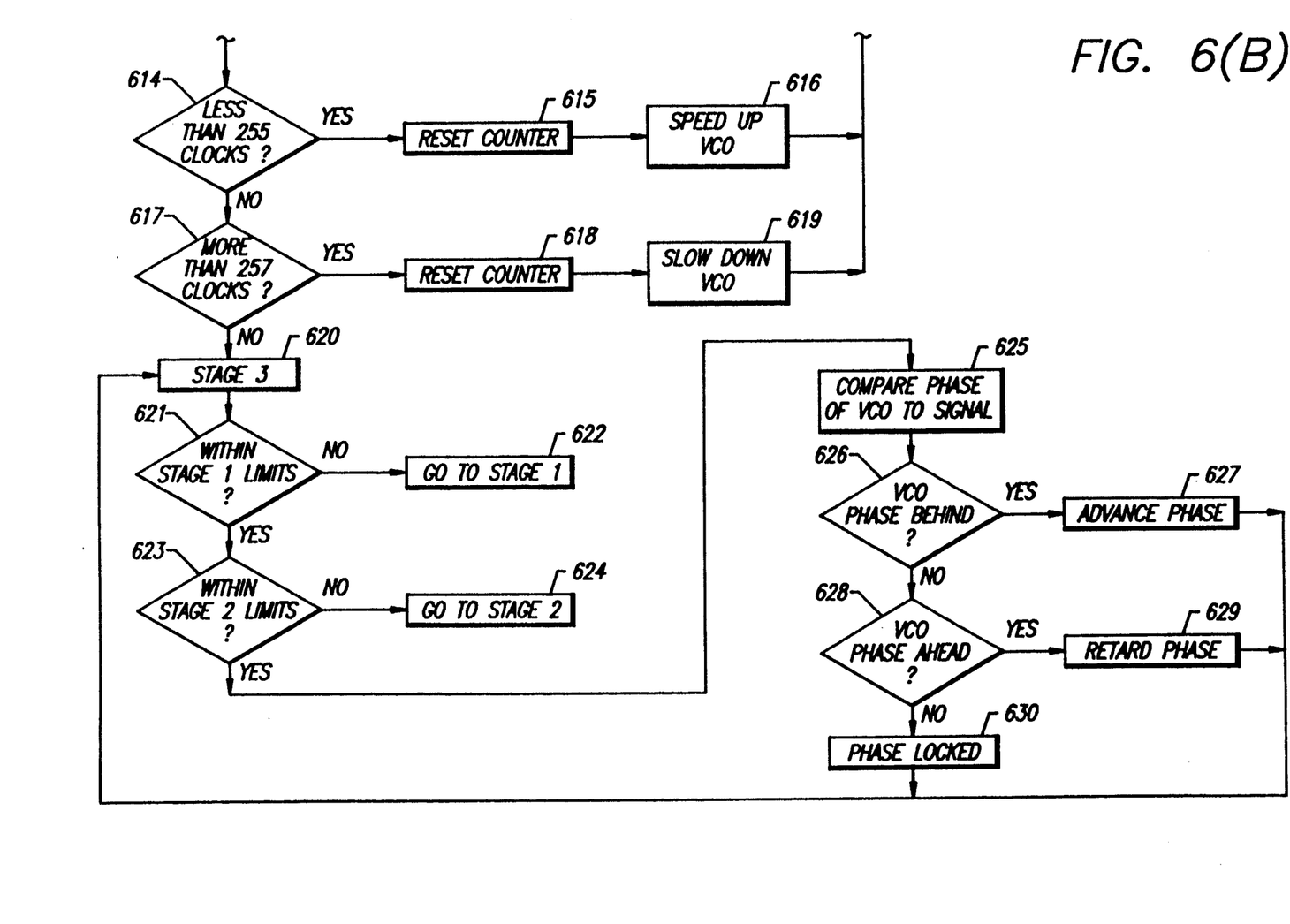

It is certified that error appears in the above-identified patent and that said Letters Patent is hereby corrected as shown below:

In column 5, line 13, please delete "FIG. 6(A-B) is a flowchart" and insert in place thereof --FIG. 6A and 6B are flowcharts--.
In column 13, line 63 please delete "FIG. 6 is a flowchart" and insert in place thereof --FIG. 6A and 6B are flowcharts--.

Signed and Sealed this

Twenty-third Day of August, 1994

Attest:

BRUCE LEHMAN

Attesting Officer      Commissioner of Patents and Trademarks